Figure 1:
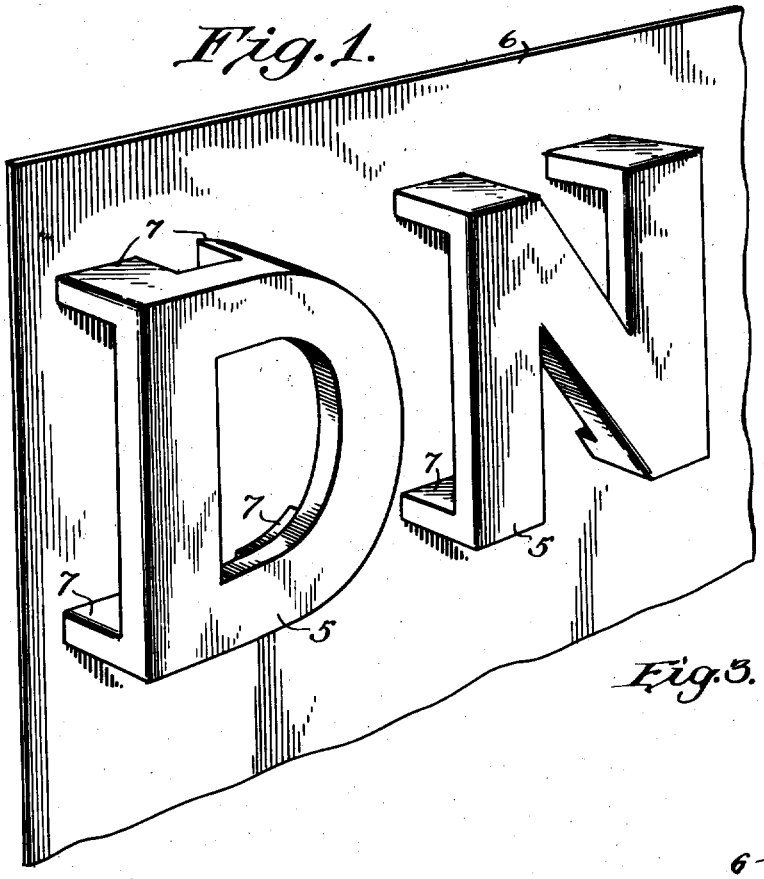

May 27, 1924. Re. 15,847

J. E. GEE ET AL

DISPLAY DEVICE

Original Filed Nov. 25, 1922

Inventor

James Edwin Gee and Frederick Samuel Gee,

Arthur J. Stephens,

Attorney

Reissued May 27, 1924. Re. 15,847

UNITED STATES PATENT OFFICE.

JAMES EDWIN GEE AND FREDERICK SAMUEL GEE, OF LONDON, ENGLAND.

DISPLAY DEVICE.

Original No. 1,463,740, dated July 31, 1923, Serial No. 603,329, filed November 25, 1922. Application for reissue filed November 28, 1923. Serial No. 677,517.

*To all whom it may concern:*

Be it known that we, JAMES EDWIN GEE and FREDERICK SAMUEL GEE, both subjects of the King of Great Britain and Ireland, residing at 235 High Holborn, London, W. C. 1, England, have invented new and useful Improvements in or Relating to Display Devices (on which application has been made for Letters Patent in Great Britain, No. 32,713, filed the 6th December, 1921, cognate with No. 26,726, filed 3rd October, 1922), of which the following is a specification.

This invention is for improvements in or relating to those display devices in which an advertisement or other notice is formed by tablets constituting characters (such as letters, numbers and the like) which are adapted to be positioned and held upon a support, the tablet being formed with feet to abut a support, said feet being integral with the remainder of the tablet.

According to the present invention the tablet has feet formed integrally by portions bent over at its margins, the feet allowing the tablet to stand firmly on the supporting surface and form an angle with said supporting surface.

The invention is particularly applicable to a magnetic display device of the type in which small permanent magnets are incorporated in display tablets, the latter being thus adapted to be held by a magnetic attraction upon a support of para-magnetic material such as an iron or steel plate.

The invention therefore includes a display tablet for use in a magnetic display device of the kind specified above, and characterized by the fact that the tablet is of para-magnetic material with the feet aforesaid constituting magnet poles.

It has been found that when only two magnet poles are incorporated in each tablet as heretofore and when the tablets are small (for example, half-an-inch in length and width) there may not be sufficient magnetic attraction exerted to ensure that the tablets will remain undisturbed in their position on the support when the latter is subjected to slight shocks or vibrations or when the whole device is moved by hand from place to place. In order to overcome this difficulty more than two magnet poles (preferably constituting two or more pairs of poles) are, according to a feature of this invention, provided in one and the same tablet. This construction has the additional advantage of forming a more rigid base to abut the support, as will be more particularly described hereinafter.

The marginal portions of each tablet whether the latter is to be used in connection with a magnetic display device or otherwise, are so arranged and are of such length as to maintain the display surface of the character at any desired distance from the support and at any desired angle thereto.

One preferred form of the invention as applied to a magnetic display device will now be described in detail by way of example with reference to the accompanying drawings in which—

Figure 3:
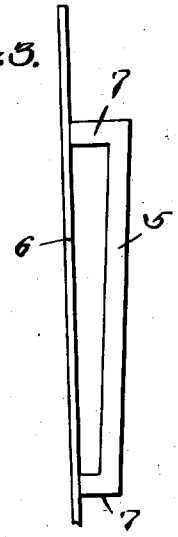
Figure 2:
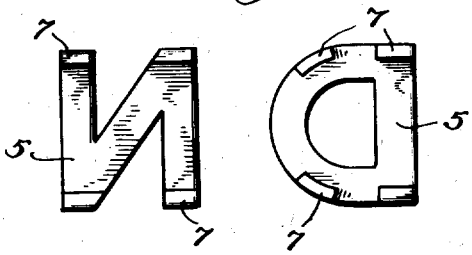

Figure 1 is a perspective view, on an enlarged scale, of a portion of a support with two tablets in position thereon, and Figure 2 is a plan of two tablets viewed in the direction of their reverse sides; and Fig. 3 is an end elevation of one form of my device showing the lower feet shorter than the upper feet so that the sign letter will be placed at an angle to the support.

The tablets 5 are cut out from a sheet of para-magnetic material, conveniently by stamping and in the present example each tablet represents in outline a letter of the alphabet—the letters D and N being illustrated. Each tablet is formed with a plurality of lugs 7 which extend outwards from the periphery of the tablet and at approximately opposite margins thereof. In the two letters shown in the drawings there are four lugs on each letter. These lugs are bent over to lie substantially at right-angles to the display face of the character. Conveniently the tablets are cut out from sheet material, and the lugs bent over in the required manner in a single stamping operation. Each tablet is magnetized and thereupon becomes virtually a small permanent magnet, the poles being constituted by the lugs aforesaid and the yoke by that part of the tablet which bridges between the poles. Thus, with the two letters illustrated there are two small permanent magnets incorporated in each tablet, the two poles at the top of the tablet being of opposite polarity to those at the bottom. In general with any tablet the latter is so magnetized that the poles on opposite sides of a straight line crossing the tablet are of opposite polarity.

A backing or support 6 in the form of a sheet of para-magnetic material is provided as a positioning member for the tablets. The display surface of the support may be ornamented in any desired manner, and similarly the display faces of the letters may also be ornamented.

It will be seen that the lugs 7 forming the magnet poles also constitute foot members to rest upon the surface of the support. It will also be seen that by the provision of a plurality of such foot members not only is a rigid base provided for each tablet but also the magnetic attraction between the tablets and the support is enhanced. The distance at which the display surface of the letters is spaced from the support is determined by the depth of the lugs 7. In the example illustrated these lugs are of equal length, and the display surface of the letters is therefore parallel with the surface of the support. If the letters are required to stand out at an angle to the support it is only necessary to make the lugs at one margin of shorter length than those at the opposite margin.

In the foregoing example the invention has been described in its application to magnetic display apparatus. As before stated the invention is applicable also to display devices in general. That is to say, magnetic attraction does not necessarily form the holding means between the tablet and the support; and the tablets do not therefore, of necessity, require to be made of para-magnetic material. Thus the tablets 5, representing the letters D and N in the drawing, might be secured in any desired manner, for example by soldering, to a support such as 6. Whatever method be adopted to secure the tablets to the support, the former are in each case characterized by the provision of feet by means of which the characters represented by the tablets are spaced apart from the surface of the support to which they are applied.

What we claim is:—

1. A display device comprising a plate of magnetic material, a detachable tablet of desired shape and character formed of para-magnetic material and a plurality of pairs of feet formed integrally with said tablet, said feet being adapted to form pairs of magnetic poles for the attachment of the said tablet to the surface of the said plate.

2. A display device comprising a plate of magnetic material, a detachable tablet of desired shape and character formed of para-magnetic material and a plurality of pairs of feet, the feet of each pair being of the same length, formed integrally with said tablet, said feet being adapted to form pairs of magnetic poles for the attachment of the said tablet to the surface of the said plate.

3. A display device comprising a plate of magnetic material, a detachable tablet of desired shape and character formed of para-magnetic material and a plurality of feet formed integrally with said tablet, said feet being adapted to form magnetic poles for the attachment of said feet to the surface of said plate, said feet upon opposite ends of the tablet being of different lengths whereby said tablet may form an angle with said surface of said plate.

4. A display device comprising a plate of magnetic material, a detachable tablet of desired shape and character formed of para-magnetic material and a plurality of pairs of feet formed integrally with said tablet, said feet being adapted to form pairs of magnetic poles for the attachment of said feet to the surface of said plate, said feet upon opposite ends of the tablet being of different lengths whereby said tablet may form an angle with said surface of said plate.

In testimony whereof we affix our signatures.

JAMES EDWIN GEE.
FREDERICK SAMUEL GEE.